(12) United States Patent
Pozgainer et al.

(10) Patent No.: US 8,353,322 B2
(45) Date of Patent: Jan. 15, 2013

(54) FILLER HEAD FOR A FUEL TANK HAVING A PROTECTIVE DEVICE

(75) Inventors: Guenther Pozgainer, Graz (AT); Thomas Fuchs, Sinabelkirchen (AT)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 507 days.

(21) Appl. No.: 12/713,470

(22) Filed: Feb. 26, 2010

(65) Prior Publication Data

US 2010/0224282 A1    Sep. 9, 2010

(30) Foreign Application Priority Data

Feb. 26, 2009   (DE) .................. 10 2009 010 406

(51) Int. Cl.
*B65B 1/04*    (2006.01)
(52) U.S. Cl. .......... 141/303; 141/59; 220/86.2
(58) Field of Classification Search .......... 141/44, 141/59, 290, 301, 302, 303, 308; 220/86.2
See application file for complete search history.

(56) References Cited

U.S. PATENT DOCUMENTS

| | | | | |
|---|---|---|---|---|
| 4,917,157 | A * | 4/1990 | Gifford et al. ............ | 141/59 |
| 5,056,570 | A * | 10/1991 | Harris et al. ............ | 141/59 |
| 6,302,133 | B1 * | 10/2001 | Kobayashi et al. ........ | 137/43 |
| 6,415,827 | B1 * | 7/2002 | Harris et al. ............ | 141/348 |
| 7,152,639 | B2 | 12/2006 | Aschoff | |
| 7,617,851 | B2 | 11/2009 | Barnes et al. | |

FOREIGN PATENT DOCUMENTS

| | | |
|---|---|---|
| DE | 3823973 | 1/1990 |
| EP | 1600317 | 11/2005 |
| WO | 2004026608 | 4/2004 |

* cited by examiner

*Primary Examiner* — Gregory Huson
*Assistant Examiner* — Jason K Niesz
(74) *Attorney, Agent, or Firm* — Bachman & LaPointe, P.C.

(57) ABSTRACT

In a tank system, a venting line (6) connects the fuel tank to an activated carbon filter, and a recirculating line (10) opens into a filler head (3). In order to prevent the penetration of liquid fuel into the activated carbon filter, to permit the seal to be checked by applying a partial vacuum and to provide a filler head which can be manufactured inexpensively, an insertion body (22) is provided which forms a funnel (23) which is adjoined by a neck (24) which accommodates the fuel nozzle, which insertion body (22) has, in addition to the neck (24), two vertical blind holes (31, 32), open at the bottom, and a transverse duct (33) which connects the latter, wherein the first blind hole (31) is connected to the recirculating line (10), and a float (40), which clears or closes off the connection to the transverse duct (33), is guided in the second blind hole (32).

11 Claims, 5 Drawing Sheets

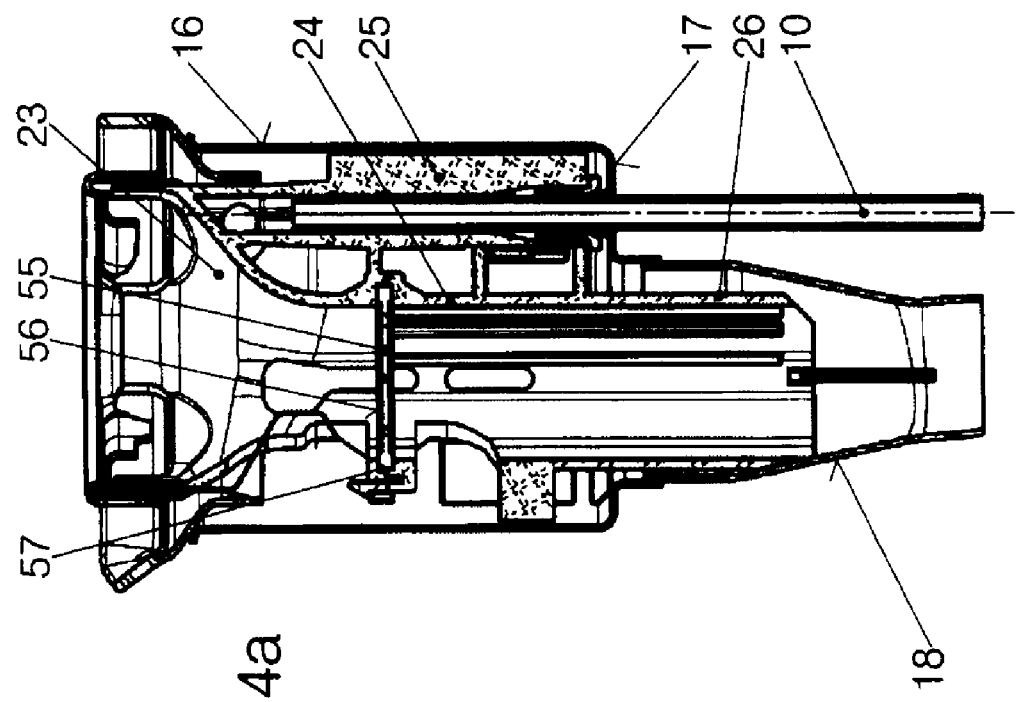
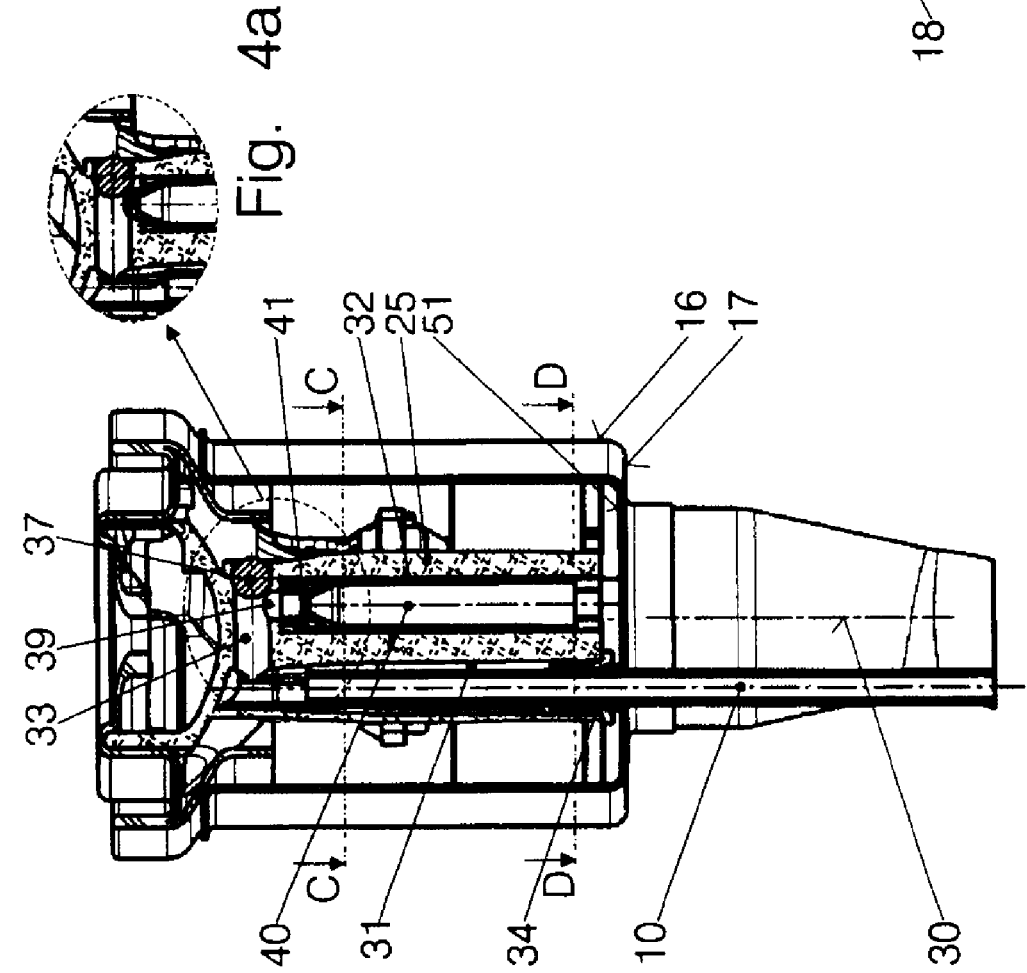

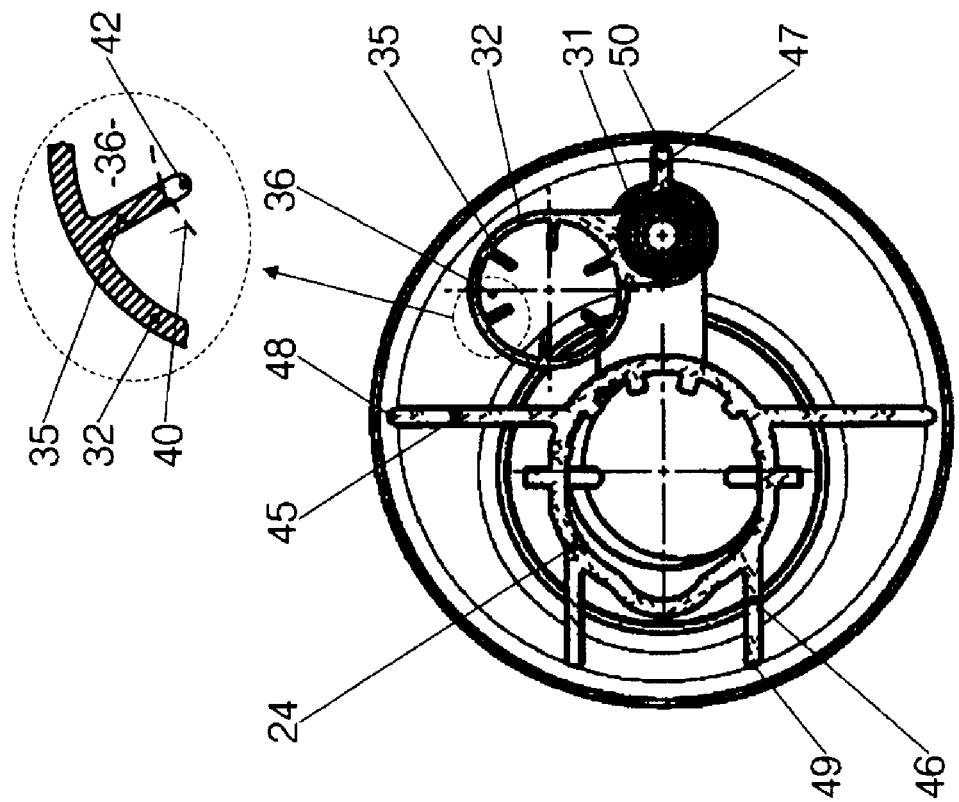
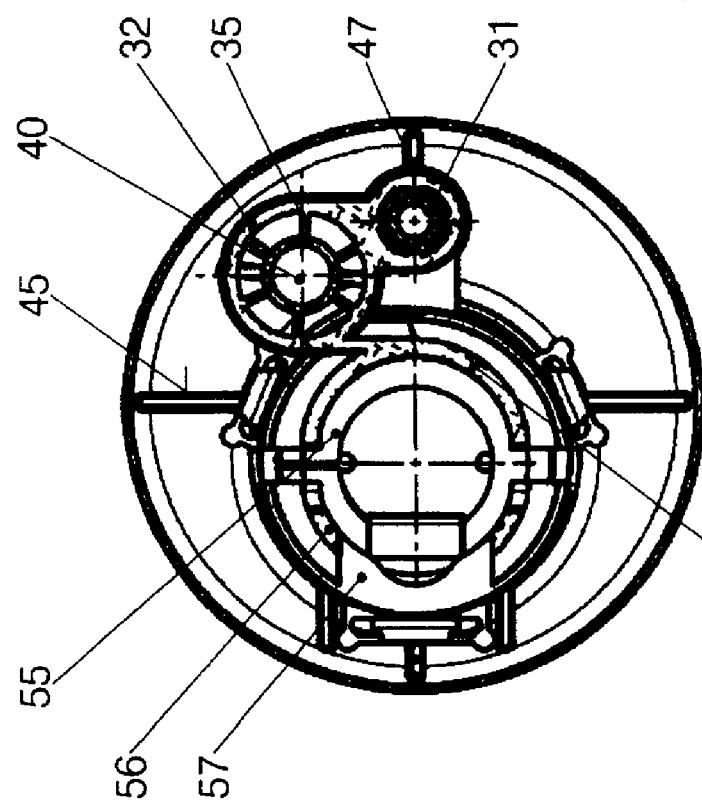
Fig. 7
Fig. 6

FILLER HEAD FOR A FUEL TANK HAVING A PROTECTIVE DEVICE

BACKGROUND OF THE INVENTION

The invention relates to a filler head for a fuel tank of a motor vehicle, formed by a housing which is connected to the filler pipe which leads to the fuel tank, in which housing a neck which accommodates a fuel nozzle is provided and into which a recirculating line opens, wherein a venting line connects the uppermost region of the fuel tank to an activated carbon filter, and the recirculating line branches off from the venting line and extends to the filler head.

Environmental protection requires that fuel and fuel vapors must not enter the environment under any circumstances. Firstly, the fuel tank and all the lines which conduct fuel must be sealed, and it must also be possible to check this. Secondly, when refueling and during the operation of an activated carbon filter (ACF for short) fuel vapors must be intercepted or fed back into the tank or to the engine. In this context, the activated carbon filter must not come into contact with liquid fuel.

EP 1 600 317 A1 has disclosed an arrangement in which a venting line feeds the fuel vapors which are expelled during refueling to an ACF. A valve on the fuel tank ensures that in this context no liquid dropplets are carried along. In order to relieve ACF of loading, a recirculating line, which opens into the filler head and which makes use of the suction prevailing in the filler head or in the adjoining filler pipe during refueling in order to feed back into the tank the vapors which are expelled during refueling, branches off from the venting line. When the fuel tank has reached the highest level, the pump which feeds the fuel nozzle is switched off by a known mechanism.

However, if this mechanism does not respond or does not respond quickly enough, the level of liquid in the filler pipe rises to such an extent that liquid fuel passes into the recirculating line and from there on into the ACF. A throttle point in the recirculating line is proposed there as an admittedly inadequate preventive measure. However, liquid must be reliably prevented from being transferred into the ACF. In contrast, an advantage of the arrangement described in said document is that when the filler head is closed the seal of the fuel tank and of the filler pipe can be checked by applying a partial vacuum to the ACF. Checking the seal by means of an overpressure would be much more complicated.

WO 2004/026608 A1 discloses a venting arrangement which provides a spring-loaded needle float valve in the recirculating line in order to prevent liquid fuel from penetrating the recirculating line. The arrangement of the valve outside the filler head has the result that if the deactivation device fails the stream of liquid fills the filler head and can therefore also pass into the surroundings. The valve is illustrated only schematically. Nevertheless it is apparent that it is therefore not possible to check the seal by means of a partial vacuum applied to the ACF.

DE 38 23 973 A1 discloses a filler head into which not only a recirculating line but rather the entire venting line opens, and from where there is a direct connection to an ACF. However, this means that during refueling all the expelled vapors pass into the filler head. When the fuel nozzle is entirely opened, this is a considerable volume flow at high speed. The part of the vapors which is not carried back into the tank by the suction passes into the ACF through a valve arrangement which has a large number of deflection points and constrictions.

This valve arrangement is composed essentially of a float which surrounds the neck of the filler head which guides the fuel nozzle and which, in a floated-up position, closes off the outlet to the line which leads to the ACF. Apart from the design of this valve arrangement, which is unfavorable in terms of flow, complex and difficult to assemble, it is to be noted that it functions only when the filler pipe extends obliquely (but not in the case of an upright filler pipe).

However, said valve arrangement suffers from the fact that if the liquid level in the filler pipe rises it cannot close in good time because the difference in levels between the inlet into the valve chamber and the outlet to the ACF in this arrangement is at any rate much too small.

The object of the present invention is to provide a securing device which avoids the disadvantages described above and which prevents liquid fuel from penetrating into the ACF and flowing out into the surroundings under any circumstances, which securing device is lightweight and inexpensive to manufacture and mount and which ultimately permits checking of the seal by applying a partial vacuum to the ACF.

SUMMARY OF THE INVENTION

The object is achieved by providing a filler head for a fuel tank, formed by a housing (15) which is connected to the filler pipe (2) which leads to the fuel tank, in which housing (15) a neck which accommodates a fuel nozzle is provided and into which a recirculating line (10) opens, wherein a venting line (6) connects the uppermost region of the fuel tank to an activated carbon filter, and the recirculating line (10) branches off from the venting line (6) and extends to the filler head (3), characterized in that an insertion body (22) is seated in the filler head (3), a) the upper part of which insertion body (22) forms a funnel (23) which starts from the upper edge of the housing (15) and is adjoined in the downward direction by the neck (24) which accommodates a fuel nozzle, b) which insertion body (22) has, in addition to the neck (24), a first and a second essentially vertical blind hole (31, 32), open in the downward direction, and the upper ends of the blind holes have a flow connection to one another through a transverse duct (33), c) wherein the first blind hole (31) is connected to the recirculating line (10), and d) wherein a float (40), which clears or closes off the connection to the transverse duct (33) is guided in the second blind hole (32), wherein the float (40) ends in the lower part of the second blind hole (32).

By virtue of the fact that the transverse duct, which connects the two vertical blind holes is located at the upper ends thereof, that is to say at a very high position, and by virtue of the fact that the float ends in the lower part of the second blind hole, it is ensured, even when the liquid level rises quickly (when the deactivation device fails), that the liquid level does not reach the transverse duct and so does not pass into the recirculating line. Even if the liquid level reaches the level of the transverse duct, the float valve has until then closed off access to it in a reliably sealed fashion.

The float valve, which closes only when the liquid level rises, permits the seal of the entire tank system to be checked by applying a partial vacuum to the ACF.

The blind holes and the transverse duct are, in addition to the neck which accommodates the fuel nozzle, also arranged with the funnel. This is all combined to form an insertion body which can be implemented in one part or two parts and can easily be inserted into the housing. The vertical orientation (vertical is to be understood as meaning in the direction of the longitudinal axis of the filler head here and in the text which follows) of the first blind hole permits a simple connection to the recirculating line when the insertion body is installed by virtue of the fact that said insertion body is simply inserted into the housing of the filler head in the vertical direction.

The connection of the recirculating line is best produced here by virtue of the fact that it penetrates the wall in the housing in the direction of the blind hole and projects into the first blind hole, wherein it is connected in a sealed and fixed fashion to the housing and can be displaced in a seal-forming fashion in the first blind hole.

The float in the second blind hole is a hollow body which is long in the vertical direction and is preferably open at the bottom, and the upper end of which comes to a tip and interacts with a bore with a diameter which is smaller than that of the float, and the second blind hole has a number of vertical lugs which are distributed along the circumference and are directed inward. The upper end of the float itself therefore directly forms a valve needle, and its lower end is near to the lower end of the second blind hole. As a result a large difference in level is brought about between the liquid level of the response and closing of the valve, and the transverse duct. The spaces which remain free in the second blind hole between the vertical lugs, which guide the float, and the float, provide the vapor stream during the filling of the fuel tank with large cross sections with a small flow resistance with the result that the suction can be fully utilized in order to recirculate a large part of the gases expelled in the fuel tank. This relieves the loading on the ACF.

A practical development consists in the fact that the float is secured in the second blind hole to prevent it from dropping out by means of flexible lugs. The parts secure the float against dropping out during installation of the insertion piece in the housing; said insertion piece is pushed into the blind hole before installation by bending the ends of the lugs, and can no longer drop out.

In advantageous developments, the insertion body has a number of outwardly projecting vertical webs, the outer edge of which is supported on the inside of the housing wall, and the lower edges thereof form stops which determine the vertical position of the insertion body in the housing.

In a further refinement of the inventive concept, a sealing means, for example a sealing ring, which surrounds the spout of the fuel nozzle in a seal-forming fashion, is provided in the part of the insertion body which forms the neck. This also contributes to preventing any fuel getting into the open air during refueling. In a practically advantageous development, the part of the insertion body which forms the neck has a seat into which the sealing means, the sealing ring, can be inserted before the two individual parts of the insertion body are joined. This facilitates the manufacture of the (usually injection-molded) insertion piece.

A further improvement of the function is achieved with little additional outlay by virtue of the fact that the neck which accommodates the fuel nozzle extends downward into a conical space which forms the transition between the housing of the filler head and the filler pipe. The suction which is generated by the inflowing fuel is therefore amplified during refueling, as a result of which more expelled fuel vapor is recirculated.

BRIEF DESCRIPTION OF THE DRAWINGS

FIG. 4: shows a section through AA in FIG. 3, of the float valve in an open position, FIG. 4a: shows, like FIG. 4, a float valve, in a closed position, FIG. 5: shows a section according to BB in FIG. 3, FIG. 6 shows a section according to CC in FIG. 4, and FIG. 7 shows a section according to DD in FIG. 4.

DETAILED DESCRIPTION

Figure 1:
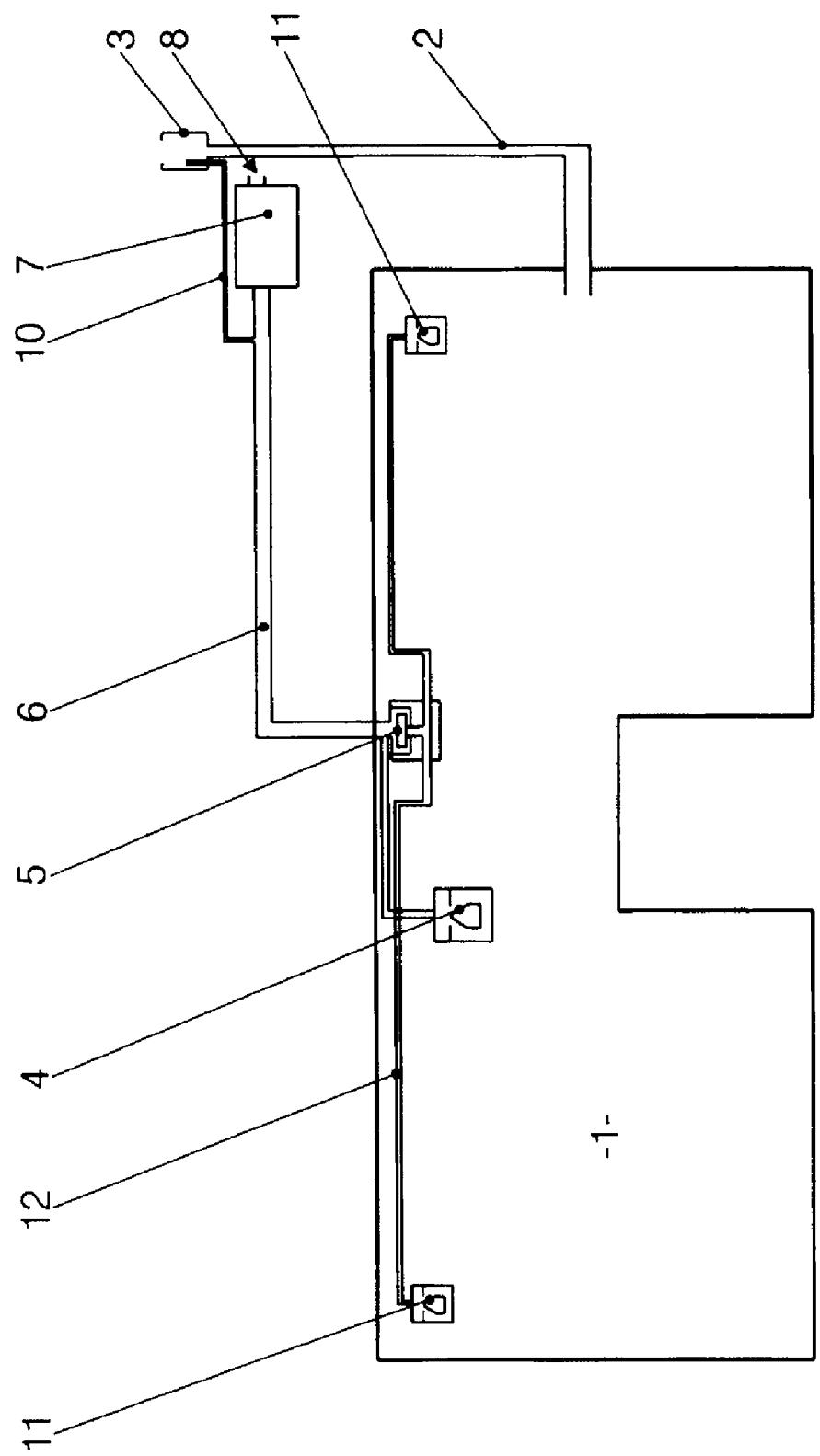
FIG. 1: shows a scheme of the ventilation system according to the invention.

In FIG. 1, a fuel tank of a saddle design is denoted in its entirety by 1 and the filler pipe by 2. The filler pipe 2 ends remotely from the tank in a filler head 3 which is closed off during operation by a cover (not illustrated) and into which the spout of a fuel nozzle (not illustrated) is introduced for the purpose of refueling. The air/fuel vapor mixture which is expelled from the tank in the process flows through a refueling venting valve 4, a pressure-keeping valve 5 and a venting line 6 to an activated carbon filter 7 (referred to below in abbreviated form as ACF). The outlet 8 of said activated carbon filter 7 leads either into the open air or to the intake section of an internal combustion engine (not illustrated). A partial vacuum is applied to this outlet in order to check the seal of the tank. A recirculating line 10 branches off from the venting line 6 and leads to the filler head 3.

The refueling venting valve 4 is a float valve which, when the maximum filling level is reached, closes with the result that the liquid level in the filler pipe 2 rises under the accompanying effect of the pressure-keeping valve 5, and therefore causes the pump which feeds the fuel nozzle to be switched off. Because of the horizontal extent of the tank, two operational venting valves 11 are still connected to the pressure-keeping valve 5 via operational venting lines 12.

Figure 2:
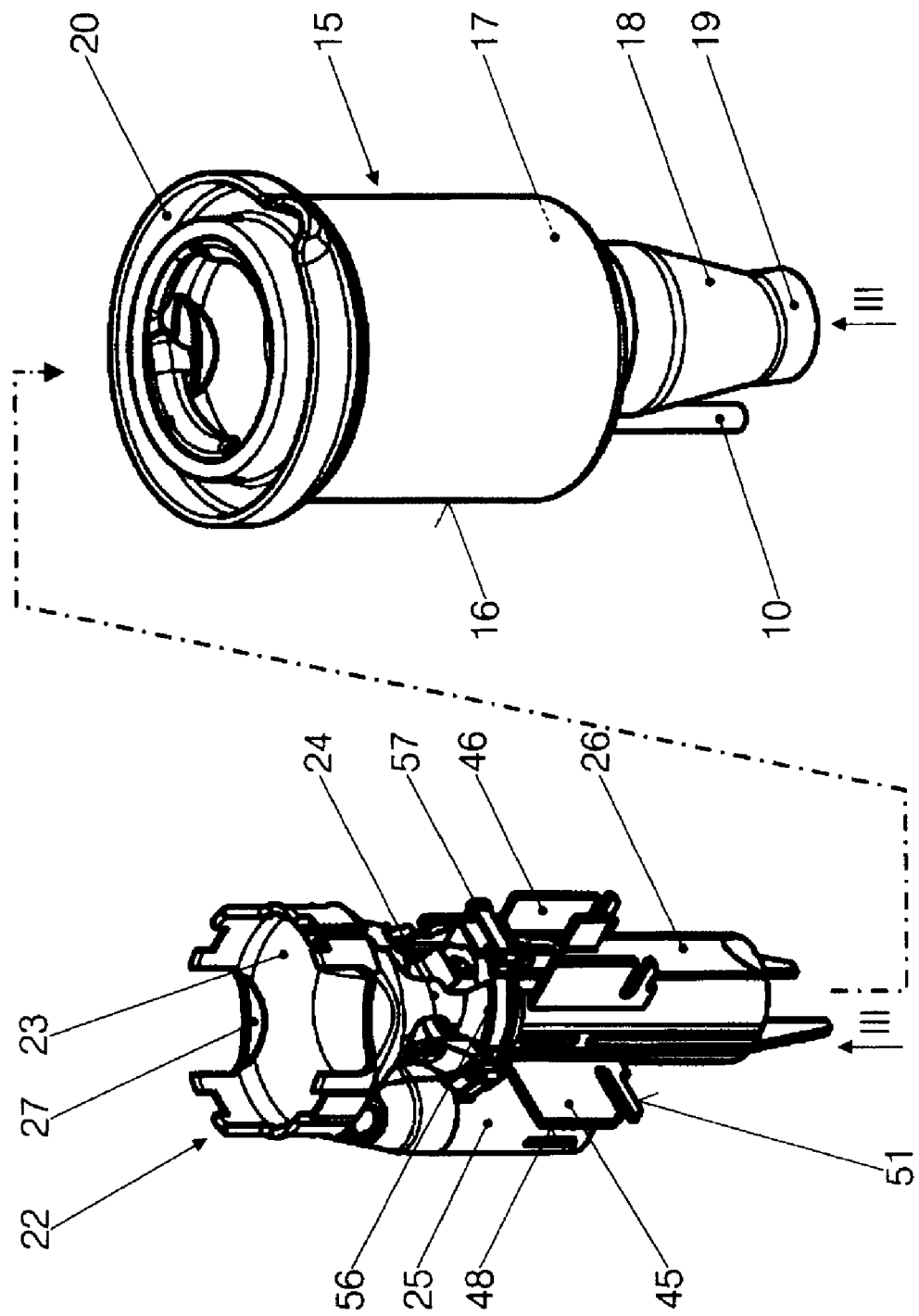
FIG. 2: shows an axonometric and exploded view of the filler head according to the invention.
Figure 3:
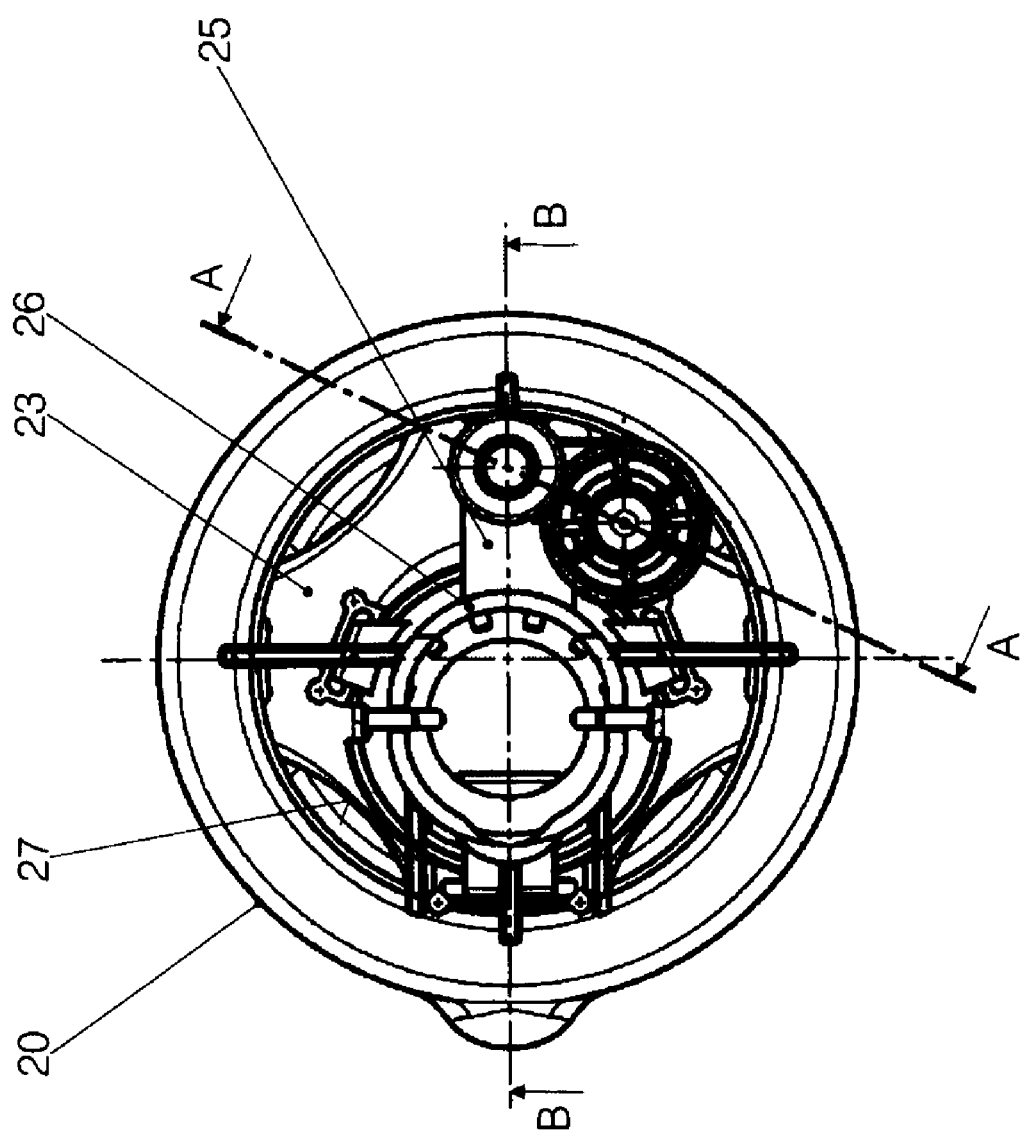
FIG. 3: shows a view according to III in FIG. 2 with the housing omitted.

FIG. 2 firstly shows, for the purpose of overview, the filler head 3 in an exploded form. Said filler head 3 is composed of a housing 15 and insertion piece 22 which fits into the latter. The housing 15, made here of sheet metal, is formed by a cylindrical casing 16 with its floor 17, a conical part 18 which adjoins the latter in the downward direction, and a connector 19 for connecting to the filler pipe 2. Seated at the upper edge of the housing is a profile ring 20 which holds the insertion piece 22 in the housing 15 and which interacts with a tank closure (not illustrated). The tubular part which leads to the floor 17 is the recirculating line 10.

Three regions can be roughly differentiated on the insertion piece 22: a funnel 23 with lowered overflow edges 27, below it a central part 24 which forms a neck for the fuel nozzle and has a securing part 25 to the side, and a lower part which adjoins the central part 24 in the downward direction and projects into the conical part 18 of the housing 15.

The insertion piece 22 is described below in more detail with reference to FIGS. 3 to 7. Here, the longitudinal axis of the central part is denoted by 30, and in the text which follows its direction is referred to as vertical even if it is not vertical in the vehicle. The insertion piece 22 may be a single injection-molded part made of plastic or metal. However, as in the exemplary embodiment shown, it can also be composed of two joined injection-molded parts. The securing part 25 thereof is integrally formed onto the side of the funnel 23 and of the metal part 24 which forms the neck (FIG. 5). The securing part 25 contains two parallel vertical blind holes 31 and 32 which are open at the bottom, and a transverse duct 33 which connects the upper ends thereof to one another (FIG. 4). The transverse duct 33 is for this purpose closed off by means of a pressed-in ball 37. The first blind hole 31 accommodates the recirculating line 10 which penetrates the floor 17 of the housing, is welded tightly thereto and can be inserted into the blind hole 31 in order to install the filler head. A sealing ring 34, which connects the recirculating line 10 to the blind hole 31, is therefore seated at the lower end of the blind hole 31.

The second blind hole 32 has a number of vertical lugs 35 which are distributed along the circumference, directed inward and guide a float 40 (FIGS. 6, 7). Through-flow ducts 36 with a considerable cross section for the fuel vapor which is recirculated during refueling are therefore provided between the wall of the blind hole 32, the float 40 and the lugs 35. The second blind hole 32 is connected via a bore 39 at its upper end to the transverse duct 33.

The float 40 is guided in the second blind hole 32. Said float 40 is a very long and narrow cylindrical hollow body which extends from the lower end of the blind hole 32 up into the vicinity of the bore 36. Because of its small diameter, the float 40 can be open at the bottom. The float (40) has, at its upper end, a cone 41 which, interacting with the lower edge of the bore 36, forms a float valve. The diameter of the bore 36 is smaller than the diameter of the float 40.

In FIG. 4, the float 40 is in the normal position and the valve is open, said float 40 rests on individual lugs 35. The lugs can be integrally formed onto the float 40 and engage in an elongate hole in the second blind hole, or they are flexible parts of the lugs in the interior of the second blind hole 32. During refueling, the expelled fuel vapor flows around the float 40 from top to bottom. During the checking of the seal, there is a flow from top to bottom around said float 40 because the partial vacuum passes into the filler head via the recirculating line.

In FIG. 4a, the float is in the floated-up position and the connection to the transverse duct 33 is closed. The float 40 moves into this position when the deactivation of the fuel nozzle is not effective, or is effective too slowly, and the liquid level in the filler pipe 2 rises to the floor 17 of the filler head. The float 40 reacts thereto very quickly and closes the bore 36 long before a further rising liquid level can have reached the level of the transverse duct.

For the purpose of positioning in the housing 15, the insertion piece 22 has integrally formed-on, vertical webs 45, 46, 47 whose vertical edges 48, 49, 50 bear on the inside of the cylindrical casing 16 and whose lower edges 51 (only one can be seen in FIG. 2 and FIG. 4) are supported on the floor 17 of the housing. As a result, the access from the filler pipe 2 to the second blind hole 32 which contains the float 40 remains free.

In the central part 24, which forms the neck, of the insertion piece 22, a sealing ring 55 is provided which surrounds the spout of the fuel nozzle during refueling. The sealing ring 55 is seated in a bracket 57 which is inserted into a seat 56 of the central part (FIGS. 2, 5 and 6).

Overall, the design which is described only by way of example provides secure protection of the activated carbon filter against the ingress of liquid under all circumstances, and checking of the fuel tank is made possible by applying a partial vacuum. Furthermore, the elements which are used for this purpose are combined in a single insertion piece which is advantageous in terms of fabrication technology and can be composed of two joined parts.

The invention claimed is:

1. Filler head for a fuel tank, formed by a housing which is connected to the filler pipe which leads to the fuel tank, in which housing a neck which is adapted to accommodate a fuel nozzle is provided and into which a recirculating line opens, wherein a venting line connects the uppermost region of the fuel tank to an activated carbon filter, and the recirculating line branches off from the venting line and extends to the filler head, an insertion body is seated in the filler head, an upper part of the insertion body forms a funnel which starts from an upper edge of the housing and is adjoined in a downward direction by a neck which accommodates a fuel nozzle, the insertion body has, in addition to the neck, a first and a second essentially vertical blind hole, open in a downward direction, wherein upper ends of the blind holes have a flow connection to one another through a transverse duct, the first blind hole is connected to the recirculating line, and a float, which clears or closes off the connection to the transverse duct is guided in the second blind hole, wherein the float ends in a lower part of the second blind hole.

2. Filler head according to claim 1, wherein the recirculating line penetrates a wall in the housing in a direction of the first blind hole and projects into the first blind hole, wherein the recirculating line is connected in a sealed and fixed fashion to the housing and is displaced in a seal-forming fashion in the first blind hole.

3. Filler head according to claim 1, wherein the float in the second blind hole comprises a hollow cylindrical body which has a vertical length greater than its diameter and has an upper end of which forms a cone and interacts with a bore which has a diameter which is smaller than that of the float.

4. Filler head according to claim 3, wherein the float is open at the bottom.

5. Filler head according to claim 1, wherein the second blind hole is provided with a number of vertical lugs which are distributed along a circumference of the second blind hole, the vertical lugs are directed inward and guide the float.

6. Filler head according to claim 5, wherein the float is secured in the second blind hole to prevent it from dropping out by means of flexible lugs.

7. Filler head according to claim 1, wherein the insertion body has a number of outwardly projecting vertical webs having outer edges which are supported on the inside of the housing.

8. Filler head according to claim 7, wherein lower edges of the outwardly projecting vertical webs form stops with respect to a floor of the housing.

9. Filler head according to claim 1, wherein a sealing ring adapted to surround a spout of the fuel nozzle is provided in a part of the insertion body which forms the neck.

10. Filler head according to claim 9, wherein the part of the insertion body which forms the neck has, in a transverse direction with respect to the vertical, a seat into which the sealing ring can be inserted.

11. Filler head according to claim 1, wherein the neck which is adapted to accommodate the fuel nozzle has a vertical length which extends downward into a conical space which forms a transition between the housing of the filler head and the filler pipe.

* * * * *